UNITED STATES PATENT OFFICE.

DAVID T. HALL, OF NORWALK, OHIO.

IMPROVEMENT IN VARNISH OR POLISHING COMPOUNDS.

Specification forming part of Letters Patent No. 150,951, dated May 19, 1874; application filed November 18, 1873.

*To all whom it may concern:*

Be it known that I, DAVID T. HALL, of Norwalk, county of Huron, in the State of Ohio, have invented a new and Improved Compound or India-Rubber Finish for polishing and finishing furniture, and all kinds of varnished or oiled work, of which the following is a specification:

The object of this invention is to prevent the checking or cracking of varnish in process of hardening, by drying or age, by combining the polish with it, and to restore varnish which is checked by an application of the polish.

To enable others skilled in the science of chemistry to make and use my invention, I will proceed to describe the process of manufacture.

In an open glass or earthen vessel I put one and one-half gallon of linseed-oil, and dissolve in it, by gentle heat, two and one-half ounces of dragon's-blood, (previously ground and pulverized,) also two ounces of gum-zanzibar, or other resinous gum treated in the same manner. To this add one and one-quarter ounce of pulverized borax, one ounce of potassia iodide, then to the whole one pound nitro-sulphuric acid, slowly and carefully. This I let stand in a cool place one or two days, stirring occasionally. I then dissolve one ounce india-rubber (native or pure) in one pound of bisulphuret of carbon. To this add six quarts of spirits turpentine, and add the whole to the first-named mixture; strain and let stand five hours.

I do not claim, broadly, the use of india-rubber (caoutchouc) in a flexible varnish or varnish compound, as the same has previously been used.

What I claim as my invention, and desire to secure by Letters Patent, is—

The herein-described polishing compound, composed of the ingredients and substantially in the proportions herein set forth.

DAVID T. HALL.

Witnesses:
 JONAS HINKLEY,
 GEO. Q. ADAMS.